United States Patent [19]

White, Jr. et al.

[11] 4,197,095
[45] Apr. 8, 1980

[54] HEATLESS ADSORBENT FRACTIONATORS WITH MICROPROCESSOR CYCLE CONTROL AND PROCESS

[75] Inventors: Donald H. White, Jr., Homer; Marcel G. Verrando, Cortland, both of N.Y.; Charles R. Picek, Cockeysville, Md.

[73] Assignee: Pall Corporation, Glen Cove, N.Y.

[21] Appl. No.: 938,542

[22] Filed: Aug. 31, 1978

[51] Int. Cl.² .............................................. B01D 53/04
[52] U.S. Cl. ............................................. 55/20; 55/21; 55/33; 55/62; 55/75; 55/162; 55/163; 55/179; 55/275; 55/389
[58] Field of Search .................. 34/15, 54, 80; 55/20, 55/21, 33, 35, 58, 62, 74, 75, 160–163, 179, 208, 275, 387, 389

[56] References Cited
U.S. PATENT DOCUMENTS

| 2,525,535 | 10/1950 | Erisman et al. | 34/54 |
| 2,800,197 | 7/1957 | Wynkoop | 55/58 |
| 2,944,627 | 7/1960 | Skarstrom | 55/33 |
| 3,257,772 | 6/1966 | Maddox et al. | 55/163 X |
| 3,359,706 | 12/1967 | Zankey | 55/163 X |
| 3,448,561 | 6/1969 | Seibert et al. | 55/20 |
| 3,775,946 | 12/1973 | Brazzel | 55/161 X |
| 4,023,940 | 5/1977 | Shultz | 55/163 |

Primary Examiner—Robert H. Spitzer

[57] ABSTRACT

A method and apparatus are provided for adsorbing one or more first gases from a mixture thereof with a second gas to reduce the concentration of first gas in the mixture to below a permissible maximum concentration. The flow rate, inlet and outlet temperatures, inlet and outlet pressures and regenerating pressures are sensed, and the sensed information fed to a microprocessor programmed to calculate the quantity of purge required to regenerate the adsorbent bed off-stream for regeneration, calculate the purge flow rate, and, based on these calculations, control the regeneration time so that purge flow ceases when the adsorbent bed has been regenerated, control the cycling time, and switch the adsorbent beds at the end of each cycle period. The system is particularly applicable to the drying of gases.

25 Claims, 4 Drawing Figures

HEATLESS ADSORBENT FRACTIONATORS WITH MICROPROCESSOR CYCLE CONTROL AND PROCESS

Desiccant dryers have been marketed for many years and are in wide use throughout the world. The usual type is made up of two desiccant beds, one of which is being regenerated while the other is on the drying cycle. The gas to be dried is passed through the one desiccant bed in one direction in the drying cycle, and then, at a predetermined time interval, when the desiccant can be expected to have adsorbed so much moisture that there is a danger that the required low moisture level of the effluent gas will not be met, the influent gas is switched to the other bed, and the spent bed is regenerated by heating and/or by evacuation and/or by passing purge effluent gas therethrough, usually in counterflow.

Desiccant dryers on the market today are of two general types, a heat-reactivatable type, in which heat is applied to regenerate the spent desiccant at the conclusion of the drying cycle, and a heatless dryer, in which heat is not applied to regenerate the spent desiccant at the conclusion of the drying cycle, but which relies upon the use of a purge flow of dry gas, usually effluent gas from the bed on the drying cycle, which is passed through the spent bed at a lower pressure, with rapid cycling to conserve the heat of adsorption to aid in the regeneration of the spent bed. The use of a purge gas to regenerate at a lower pressure than the line pressure of the gas being dried is not, however, confined to heatless dryers, but was used in heat-reactivated desiccant dryers for many years before the advent of the heatless type.

Both types of dryers are normally operated with fixed time drying and regenerating cycles, usually equal in duration, with the length of the cycles being fixed according to the volume of desiccant available and the moisture content of the influent air. The time of the cycle is invariably fixed at much less time than might be permitted, in order to ensure that the moisture content of the effluent gas will always meet the system requirements. As the drying cycle proceeds, the desiccant bed becomes progressively more and more saturated from the inlet end towards the outlet end, and less and less capable of adsorbing moisture that is carried through it by the influent gas. Removal of moisture from the influent gas depends upon the rate of flow of the gas and the rate of moisture adsorption and moisture content of the adsorbent, as well as the temperature and pressure of gas within the bed. The rate of adsorption by the desiccant may decrease as the desiccant becomes loaded. Since the moisture content of an influent gas is rarely constant, the demand put upon the desiccant bed can vary, sometimes rather rapidly, and sometimes within rather wide limits. Consequently, a fixed time drying cycle must always be short enough to give a safe margin for moisture removal at maximum moisture content of the influent gas, and this means that frequently a fixed time cycle must be rather short, to be sure it is ended before the available remaining moisture capacity of the bed reaches too low a level. This means, of course, that in the average cycle, the moisture capacity of the bed may not be well utilized.

The life of a desiccant that is heated in order to regenerate it is to a considerable extent dependent upon the frequency of regeneration. It is a rule of thumb in the trade that a desiccant bed is good for a certain number of regenerations, and no more. Obviously, then, the effective life of a bed is shortened unnecessarily, whenever during each drying cycle the moisture capacity is not effectively utilized. Furthermore, the inability to achieve a full utilization of the effective bed capacity during each drying cycle, both in the case of heat-reactivated and heatless dryers, means that the volume of the desiccant bed must be more than what might be required, to provide the reserve capacity needed to adsorb extreme but occasional moisture levels of the influent gas during the fixed time period of the drying cycle.

Inefficient utilization of moisture capacity also leads to a considerable waste of purge gas with each cycle. Purge gas is normally bled off from the effluent gas, for the purpose of regeneration of a spent bed, and correspondingly reduces the yield of effluent. Each time a bed is transferred from the drying cycle to the regenerating cycle, a volume of purge gas equal to the open volume of the bed vessel is necessarily dumped, and lost. Short cycling means higher purge losses than long cycling.

Such losses are particularly severe in the case of heatless dryers, which require much more frequent cycling. Indeed, the choice between a heat-regenerated and a heatless dryer frequently is dictated by the frequency of recycling required. Skarstrom in U.S. Pat. No. 2,944,627, dated July 12, 1960, describes a type of heatless dryer which purports to represent an improvement on those described some years earlier by Wynkoop, U.S. Pat. No. 2,800,197, dated July 23, 1957, and in British Pat. Nos. 633,137 and 677,150. Skarstrom showed that by very rapid cycling between adsorption and desorption in the respective zones, the desorption cycle could effectively utilize the heat of adsorption for regeneration of spent desiccant. Skarstrom accordingly taught the use of times in the adsorption cycle not exceeding two to three minutes, preferably less than one minute, and very desirably less than twenty seconds. Such cycling times are of course shorter than Wynkoop's, which was of the order of thirty minutes or higher, as shown in the graph of FIG. 2, or the cycling times ranging from five minutes to thirty minutes, of British Pat. No. 633,137. British Pat. No. 677,150 demonstrated that the adsorption and desorption cycles need not necessarily be equal.

The drawback of the Skarstrom system, however, is the very considerable volume of purge gas lost with each cycle, and this loss is very much greater at a cycling time of, for instance, ten seconds, as compared to the British patents' five to thirty minutes, and Wynkoop's thirty minutes or longer. In the short Skarstrom cycles, of course, the capacity of the desiccant bed is very little utilized, but when no heat is applied to effect regeneration of the desiccant, it becomes more important not to carry the moisture content of the adsorbent beyond a certain minimum on the adsorption cycle, or it will be impossible effectively to regenerate the adsorbent on the regeneration cycle.

Dryers have been provided with moisture detectors in the effluent line, to measure dewpoints in the effluent gas. Because of their slow response and relative insensitivity to low dewpoints, however, such devices have not been and cannot be used to determine the cycling of a dryer when an effluent of low dewpoint or relative humidity is desired, since by the time the detector has sensed moisture in the effluent, the front has broken through the bed.

Seibert and Verrando, U.S. Pat. No. 3,448,561, patented June 10, 1969, provide process and apparatus for fractionating and especially drying gases with and without application of heat during regeneration which better utilize the moisture capacity of a desiccant bed by providing for regeneration thereof only when the moisture load on the bed requires it, and thus obtain optimum efficiency in use. During each adsorption cycle, the adsorbent bed can be brought to the limiting moisture capacity at which regeneration can be effected under the available regenerating conditions, whether these be with or without the application of heat, and with or without the application of a reduced pressure. This is made possible by detecting the advance of the moisture front within the bed, as evidenced by the moisture content of the gas being dried, and halting the drying cycle whenever the front has reached a predetermined point in the bed, short of breaking out of the bed. This can be done automatically by providing in the desiccant bed means for sensing the moisture content of the gas being dried, and means responsive to moisture content to halt the drying cycle whenever a predetermined moisture content in the gas being dried is reached at that point.

This system controls cycling according to the degree of utilization of the adsorbent bed on stream, but it does not correct purge flow to minimize loss of purge gas according to regeneration of the spent bed off-stream. Moreover, it is dependent on the sensor for the cycling, and if the sensor is inoperative or malfunctioning, the cycling is thrown off, and the moisture front may break out of the bed.

Brazzel U.S. Pat. No. 3,775,946 patented Dec. 4, 1973 provides a two adsorber gas purifier system, each adsorber having valved input and output flow lines, a valved counterflow line and a valved vent line. Simultaneously actuated in a first sense are the valved input and output flow lines on the first adsorber and the valved counterflow and vent lines on the second absorber. Simultaneously actuated in a second sense opposite the first sense are the valved input and output flow lines on the second adsorber and the valved counterflow line and the valved vent line on the first adsorber. Responsive to counterflow of the predetermined gas volume after each actuation of the valved lines, any open valved vent line in the system is closed. Responsive to reaching a near minimum in each cycle of decreasing difference in pressure between the two adsorbers the simultaneous actuation of the valved lines is initiated.

In order to purge and repressure the off steam adsorber, there is provided a line 40 leading from the line 28 with a metering unit 42 in a return gas flow loop. The loop leading from the metering unit 42 includes a flow control valve 44 whose output then passes by way of valves 46 and 48 to the top of tanks 20 and 22, respectively. A flow transmitter 50 is included in the measuring unit 42 responsive to the pressure drop across a metering orifice in unit 42 to indicate the flow rate in line 40. The flow transmitter 50 is coupled to a controller 52 which is linked by way of linkage 54 to valve 44 to vary the setting of valve 44 such that the flow rate in line 40 is constant even though the pressure in the off stream adsorber varies radically during the vent, purge and repressure stages, assuming constant flow in line 10.

A control system is provided which is responsive to the output of the flow transmitter 50 for operating valves 30, 32, 46 and 48 will be described. In addition, a differential pressure switch actuator 60 is connected at one input by way of line 62 to a pont in line 40 upstream of the measuring unit 42. It is connected at the second input thereof by way of line 64 downstream of valve 44. The differential pressure switch 60 serves to control the instant at which switch over valves 16, 18, 24 and 26 operate to change flow from adsorber 20 to adsorber 22 and vice versa.

Operation of the system is based upon the fact that the purge stage in each cycle requires flow through an off stream absorber of about the same volume of gas to remove the impurities adsorbed as the volume which flowed through the adsorber during the on stream or adsorption stage. However, the purge stage is operated at pressure near atmospheric pressure whereas the adsorption stage is operated at a very high pressure of the order of 200 p.s.i. Therefore, only a fraction of the quantity of gas must flow through the adsorber during the purge stage as is delivered to line 16 during the adsorption stage.

More particularly, the ratio of flow in line 10 to the flow in line 40 is fixed. It is determined by reference to the flow dependent pressure function produced by transmitter 13 in unit 12. Line 66 is connected to apply the reference pressure function to an input of controller 52. The second input of controller 52 is connected to flow transmitter 50. As above noted, controller 52 varies valve 44 such that the ratio of the flow rate through the valve 44 to the flow rate in the line 10 is a constant. The pressure output function applied by way of line 66 to the flow ratio controller 52 provides a set point for operation of the valve 44.

Flow transmitter 50 is connected to a flow integrator 70. Flow integrator 70 produces electrical output pulses spaced in time proportion to flow rate in line 40. The electrical pulses are applied by way of switch 71 to a counter 72. Counter 72 is of a type which is adjustable to provide a mechanical actuation as by way of linkage 74 upon the receipt of a predetermined number of pulses applied thereto by way of switch 71.

During the regeneration cycle, valve 44 is set so that about 25 percent of the gas flowing in line 28 flows through valve 44 and thence through valve 48 downward through adsorber 22. This flow sweeps out of the adsorber 22 all of the contaminants loaded into it during the preceding adsorption cycle.

Counter 72 having been automatically reset at the beginning of the adsorption cycle proceeds to be incremented in response to transmitter 70 until a predetermined count is accumulated therein. The predetermined count in counter 72 represents a flow of the purified gas through valve 44 into adsorber 22 at low pressure in the same volume as passed upward through adsorber 22 during the adsorption cycle at high pressure. When the predetermined count is reached in counter 72, switch 90 is closed by way of linkage 74.

When the predetermined volume of regeneration gas has passed through adsorber 22, momentary closure of switch 90 by counter 72 energizes relay $CR_2$. This closes switch 92 by way of linkage 102, locking relay $CR_2$, in an energized state until switch 94 is opened. Linkage 102 also serves to open switch 71 to prevent counter 72 from being further incremented during the repressure stage. At the same time, relay $CR_2$ opens switches 31c and 33c through linkage 104. Because switch 98 is open, solenoid 31a was not energized. However, switch 96 was closed and solenoid 33a was energized. Opening switch 33c deenergized solenoid 33a, altering pilot valve 33 to close valve 32, which action marks the beginning of the repressure stage.

With valve 32 closed, flow of gas through valve 44 causes the pressure in adsorber 22 to gradually increase.

While this system does limit purge flow, it does so only on the basis of a proportion of volume flow through during adsorption, and does not attempt to adjust purge flow according to actual need, i.e., based on the actual extent of depletion of the sorption capacity of the bed. Thus, it is subject to error in either more flow for regeneration than is needed, or insufficient flow for full regeneration, reducing adsorption efficiency later on.

In accordance with the invention, the difficulties attendant on use of heatless dryers are overcome by combination with a microprocessor programmed to sense the operating conditions, including flow rate, inlet and outlet temperature and pressure and regenerating pressure; from the operating conditions so sensed calculate the quantity of purge required to regenerate the adsorbent bed-off stream for regeneration, and calculate the purge flow rate; then, based on these calculations, control the regeneration time so that purge flow ceases when the adsorbent bed has been regenerated, control the cycling time, and switch the sorbent beds at the end of each cycle period.

The principle of the invention is to adjust the off-stream adsorbent bed purge flow and regeneration time to fit the degree of depletion of the adsorbent bed during the on-stream portion of the cycle. The on-stream cycle time can then be fixed, without disadvantage; since there is no waste of purge flow during regeneration, it does not matter how frequently the beds are cycled.

The process and apparatus of the invention regenerate the spent bed without application of heat to the bed, utilizing only the heat of adsorption in the bed for desorption during regeneration, and therefore are in the "heatless" category of gas fractionators.

This invention is also applicable to systems wherein part or all of the desiccant bed is heated to effect regeneration, to systems wherein regeneration is effected at reduced pressure, and to systems utilizing a purge gas flow, and to systems combining one or more of these features.

Thus, in the process of the invention, the concentration of one or more first gases in a mixture thereof with a second gas is reduced to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases; and then while passing a purge flow of gaseous effluent through the other of the two beds of sorbent to desorb first gas adsorbed thereon, and reverse the advance of the concentration front of first gas in the bed, regenerating the other bed for another cycle of adsorption; periodically interchanging the beds so that, alternately, one bed is on regeneration and the other on the adsorption portions of the cycle; sensing the operating conditions including gas flow rate through the bed on adsorption; inlet and outlet temperatures; inlet and outlet pressures; and regeneration pressure in the bed on regeneration; calculating the quantity of purge flow required to regenerate the sorbent in the bed on regeneration; calculating the purge flow rate under the operating conditions; and then controlling the regeneration time and arresting purge flow when the bed on regeneration has been regenerated; controlling cycling time at a period not shorter than the regeneration time, and switching the sorbent beds at the end of such cycling time.

Since the regeneration cycle need not be and in most cases is not of a duration equal to the drying cycle, the bed being regenerated is closed off, and heating, purge, evacuation, or whatever regeneration system is used, discontinued when regeneration is complete. The remainder of the cycle time can be used for instance for cooling down of the regenerated bed, so that it is at a convenient and efficient temperature for adsorption when the flow of influent gas to that bed is resumed.

The gas fractionating apparatus in accordance with the invention comprises as the essential components at least one and preferably two sorbent beds adapted for alternate periodic adsorption and preferably counterflow regeneration; one or a plurality of means in the beds for sensing the gas flow rate through the bed on adsorption, inlet and outlet gas temperatures and pressures, and regeneration pressure; and a microprocessor programmed to calculate the quantity of purge required to regenerate the adsorbent bed off-stream for regeneration; calculate the purge flow rate; and, based on these calculations, control the regeneration time so that purge flow ceases when the adsorbent bed has been regenerated; control the cycling time; and where there are two or more beds switch the adsorbent beds at the end of each cycle period. The system is particularly applicable to the drying of gases.

While the apparatus of the invention can be composed of one desiccant bed, the preferred apparatus employs a pair of desiccant beds, disposed in appropriate vessels, which are connected to the lines for reception of influent gas to be fractionated, and delivery of effluent fractionated gas.

The apparatus can also include a check valve or throttling valve for the purpose of reducing pressure during regeneration, and multiple channel valves for cycling the flow of influent gas between the beds and for receiving the flow of effluent gas therefrom. In addition, a metering or throttling valve can be included to divert a portion of the dried effluent gas as purge in counterflow through the bed being regenerated.

The process and apparatus of the invention utilize a microprocessor system comprising temperature and pressure transducers, a data acquisition module, an input and output module, a microprocessor, and memory storage. Any type of microprocessor can be used, including main frame computers, microcomputers, and minicomputers using a microprocessor central processing unit.

A. Examples of microprocessors:

1. Rockwell International—STC Universal Controller Module
2. Heurikon Corporation—MLP-8080 Microcomputer
3. Intel Corporation—SBC 80/20 Microcomputer or 8080A Microprocessor 4. Motorola, Inc.—Micromodule 1A microcomputer MC6800 Microprocessor
5. National Semiconductor—BLC 80-10 or INS8080A
6. Synertek—SY6502 Microprocessor
7. Zilog—Z80 Microprocessor B. Examples of memory storage:

1. National Semiconductor—BLC 416/8432
2. Motorola Inc.—Micromodule 6
3. Intel—SBC016

C. Examples of power supply with:

1. National Semiconductor—BLC665
2. Motorola, Inc.—PLT820

D. Examples of Intput/Output Modules:

1. National Semiconductor—BLC 104/116
2. Intel—SBC519

E. Examples of Data acquisition modules:

1. National Semiconductor—ADS1216HC
2. Intel—SBC711 Analog Input Board

F. Examples of Visual Displays:

1. National Semiconductor—NSB5882
2. Litronix—DL-1416
3. Monsanto—MAN6710

G. Examples of pressure transducers:

1. National Semiconductor—LX0603D and LX0603GB LX1601D and LX1730A
2. Cognition, Inc. (Div. of Emerson) dP6130, aP6030, and gP6230

H. Examples of temperature transducers:

1. National Semiconductor—LM334H, LM334Z and LM134H
2. Analog Devices—AD590J, AD590K and AD590L The load of first gas on the sorbent built up in the course of the adsorption portion of the cycle depends upon the content of first gas in the second gas, which may be variable, gas flow rate, and inlet and outlet temperature and pressure. If however during the regeneration portion of the cycle the bed is fully generated, the loading does not matter, provided the concentration front of first gas in the bed does not break out of the bed. Accordingly, the cycling time can be fixed at the longest time at which one can be sure, under the operating conditions, that the front has not broken out of the bed, with complete utilization efficiency and optimum energy conservation.

Consequently, the gas fractionators in accordance with the invention operate under a fixed time cycle, while purge regeneration flow is varied within the fixed cycle length, and automatically adjusted according to the degree of loading. The result is that a regeneration cycle is terminated when it is necessary to do so, and unnecessarily extended regeneration of the sorbent is eliminated. At the same time, the volume of purge used during each cycle is kept to an absolute minimum. In effect, the gas fractionators of the invention automatically time their regeneration cycle according to the demand made upon them by the first gas content of the influent gas, and consequently the gas fractionators in accordance with the invention are referred to as demand cycle fractionators.

The microprocessor monitors the following operating conditions to acquire the information needed on the dryer operation to control the length of the regeneration cycle. Typical locations for the sensing devices are shown in the drawings.

Figure 1:
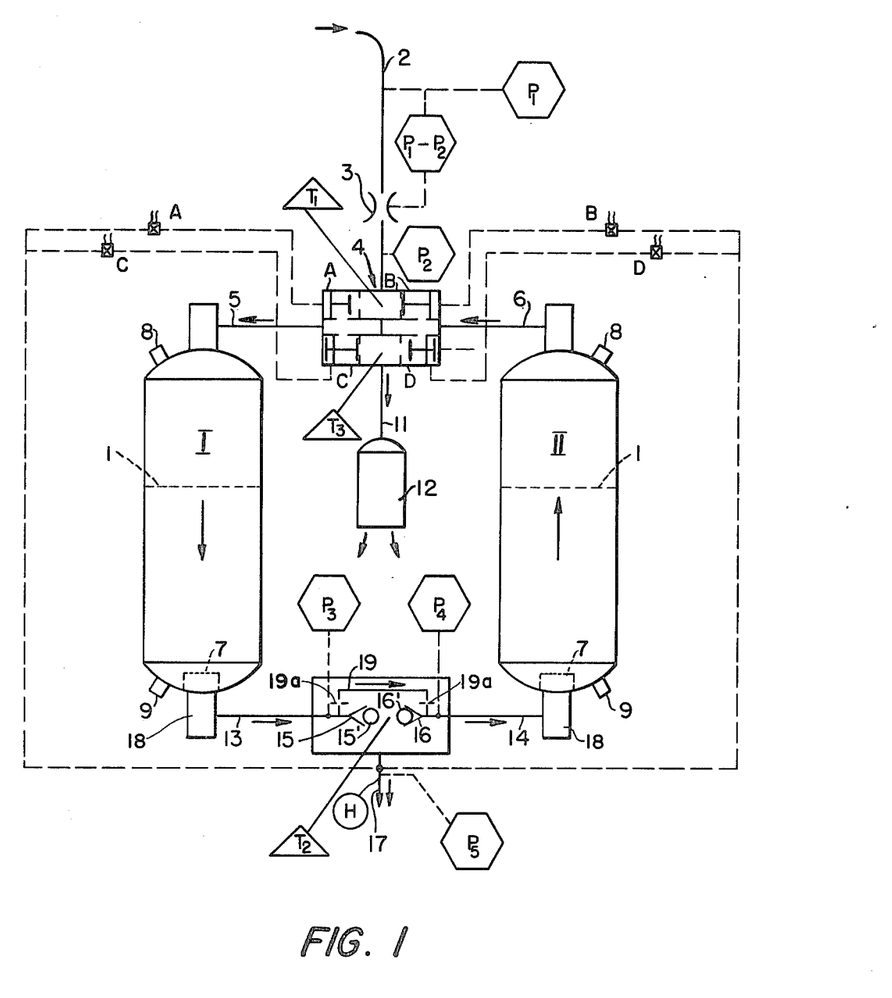
FIG. 1 is a schematic view of a two-bed heatless desiccant dryer in accordance with the invention.

1. Inlet flow rate—This can be sensed either by a differential pressure transducer sensing the loss through a device of known resistance, or by two pressure transducer signals, one from either side of the device (as shown in FIG. 1, $P_1 + P_2$ or equivalent).
2. Inlet pressure—This can be sensed by a pressure transducer ($P_1$ or $P_2$ in FIG. 1).
3. Purge pressure—This can be sensed by a pressure transducer ($P_3$ or $P_4$ in FIG. 1).
4. Regeneration pressure—This can be sensed by a pressure transducer ($P_4$ or $P_3$ in FIG. 1).
5. Temperature of the gas mixture at the inlet to the sorbent bed on the adsorption cycle ($T_1$, $T_3$ in FIG. 1).
6. Temperature of the gas mixture at the outlet of the sorbent bed on the adsorption cycle ($T_2$ in FIG. 1).
7. Temperature of the purge gas at the inlet to the sorbent bed on the regeneration cycle ($T_2$ in FIG. 1).
8. Temperature of the purge gas at the outlet to the sorbent bed on the regeneration cycle ($T_3$, $T_1$ in FIG. 1).

These can be sensed by a temperature transducer, thermocouple, thermistor or RTD sensor.

In addition to the above, the following operating conditions can also be monitored:

9. Outlet pressure of effluent gas ($P_5$ or $P_6$ in FIG. 1).
10. Purge exhaust pressure ($P_6$ or $P_5$ in FIG. 1).
11. Outlet effluent gas dewpoint—This can be sensed by a moisture sensing probe connected to the outlet line. A single pressure transducer and a single temperature tranducer may be used with an alternating signal device rather than using individual pressure and temperature transducers. The microprocessor would then control the signalling device to obtain the necessary inputs.

The microprocessor with the above information on operating conditions can calculate the required purge time using the equation:

$$tp = \frac{tf \, Qf \, Cp \, Sg^{3/2} \, T_2^{1/2} \, (P_4 - e^x) \, (T_2 - T_1) \, F_1}{P_3 \, do^2 \, e^x}$$

The equation for Tp is a combination of the following two equations:

$$Tp = \frac{Qf}{Qp} \, Tf \times \frac{(P_4 - e^x)Mg}{18 \times e^x} \times (T_2 - T_1) \times \frac{Cp}{qab \times F}$$

and $$Qp = 86.1933 Kf \times do^2 \times Y \times P_3 \times (T_2 \times S.G)^{-\frac{1}{2}}$$

where $$F_1 = 29/(18 \times qab \times F \times 86.1933 \times Kf \times Y)$$

The equation for Qp is a standard equation for flow through an orifice.

$$x = (a/T_3) + (bLnT_3) + C$$

where:
tp = required purge time, minutes.
tf = adsorption time, minutes (normally 2 or 5 minutes).
Qf = inlet flow rate, SCFM.

Cp=specific heat, BTU/°F.-lb (0.240 for air).
SG=specific gravity relative to air (Sg=1.0 for air).
$T_3$ (or $T_1$)=purge exhaust temperature, °Rankine.
$P_4$ (or $P_3$)=regeneration pressure, PSIA.
$T_2-T_1$ (or $T_3$)=sorbent bed temperature rise, °Rankine.
$T_2$=purge temperature, °Rankine.
$P_3$ (or $P_4$)=purge pressure, PSIA.
do=purge orifice diameter, inches.
$F_1$=constant of proportionality.
a, b and c=°Rankine formula constants.

The value of $e^x$ can be calculated either from Rankine's formula as shown, or from Young's formula. The values can also be found in Keenan and Keyes, *Thermodynamic Properties of Steam*, vapor pressure vs. temperature ($T_3$).

Rankine formula: $Pv = e^{[50.9195-(12034/t)-4.6576 \ln]}$
Young's formula: $Pv = e^{[16.70-(9380/t)]}$
T=°Rankine An alternate equation for the required purge time that does not take into account changes in humidity is:

$$tp = \frac{tf\, Qf\, P_1\, (Sg\, T_2)^{1/2}\, F_2}{do^2\, P_4\, P_3}$$

where:
tp=required purge time, minutes.
tf=adsorption time, minutes.
Qf=inlet flow rate, SCFM.
$P_1$=inlet pressure, PSIA.
Sg=specific gravity relative to air.
$T_2$=purge temperature, °Rankine.
do=purge orifice diameter, inches.
$P_4$ (or $P_3$)=regeneration pressure, PSIA.
$P_3$ (or $P_4$)=purge pressure, PSIA.
$F_2$=constant of proportionality.

It may be noted that, assuming two sorbent beds I and II (as in FIG. 1), the above references to temperature and pressure apply when bed I is on the adsorption cycle and bed II is on the regeneration cycle, as follows:
$T_1$=inlet temperature.
$T_2$=outlet temperature.
$T_3$=purge exhaust temperature.
$P_3$=purge pressure.
$P_4$=regeneration pressure.

After changeover, when bed II is on the adsorption cycle and bed I is on the regeneration cycle, the designations change as follows:
$T_3$=inlet temperature.
$T_2$=outlet temperature.
$T_1$=purge exhaust temperature.
$P_4$=purge pressure.
$P_3$=regeneration pressure.

The microprocessor calculates inlet flow rate using the equation:

$$Qf = C[(P_1-P_2)P_1 Sg/T_1]^{1/2}$$

where:
QF=inlet flow rate, SCFM.
$P_1$, $P_2$=pressure loss, PSID.
$P_1$=inlet pressure, PSIA.
Sg=specific gravity relative to air.
$T_1$=inlet temperature, °Rankine.
C=flow constant.

The microprocessor can then calculate energy saved per cycle according to the following equation:

$$KW - HR \text{ per } tf = [(Qd\, tf\, \frac{Pd}{14.7} - tp\, do^2 P_3 G\, (\frac{Sg}{T_2})^{1/2}]\, EP_1$$

where:
Qd=design inlet flow rate, SCFM.
tf=adsorption time, minutes.
Pd=design inlet pressure, PSIA.
tp=purge time, minutes.
do=purge orifice diameter, inches.
$P_3$ (or $P_4$)=purge pressure, PSIA.
G=purge orifice constant.
Sg=specific gravity relative to air.
$T_2$=purge temperature, °Rankine.
E=KW-HR/SCF-PSIA.
$P_1$=inlet pressure, PSIA.

At the end of each adsorption cycle (tf), the microprocessor must close the exhaust valve (D or C in FIG. 1) on the chamber on regeneration (if not already closed). When the pressure in the chamber on regeneration is raised to within 5% of the pressure in the chamber on adsorption ($P_4$ vs. $P_3$), the inlet switching valves must be actuated such that the chamber on adsorption becomes the regenerating chamber and vice versa. The purge exhaust valve must then be opened on the off-stream adsorption chamber.

The microprocessor times the purging time, and when the required flow has passed through the chamber regeneration it closes the exhaust valve.

On start-up from a "cold" condition, the microprocessor must override the purge control function for 100 drying time periods to provide for sorbent bed conditioning.

The microprocessor can fulfill a number of display functions, as desired, and can indicate the following data on a visual digital display unit, on command from one or several push buttons:
1. Inlet flow rate in SCFM=instantaneous reading.
2. Inlet pressure in PSIG=instantaneous reading.
3. Inlet temperature in °F.=instantaneous reading.
4. Energy savings=total cumulative value.

The microprocessor can also fulfill a number of alarm functions, as desired.

The controller can close two alarm circuits, in the event that either bed fails to switch over at the programmed time.

The controller can close two alarm circuits in the event the outlet moisture sensor detects an excessively high concentration of first gas in the gaseous effluent (in a drying system, dewpoint (humidity) in the gaseous effluent).

The controller can also close two alarm circuits in the event that a sensor fault is detected.

Additional functions for the microprocessor include:
(a) Varying drying time (tf) dependent upon flow rate and required outlet dewpoint.
(b) Incorporation of an automatic shutdown program with compressor interlock.
(c) Discontinuance of drying cycle with no outlet flow.
(d) Visual display of total daily air inlet flow.

Figure 2:
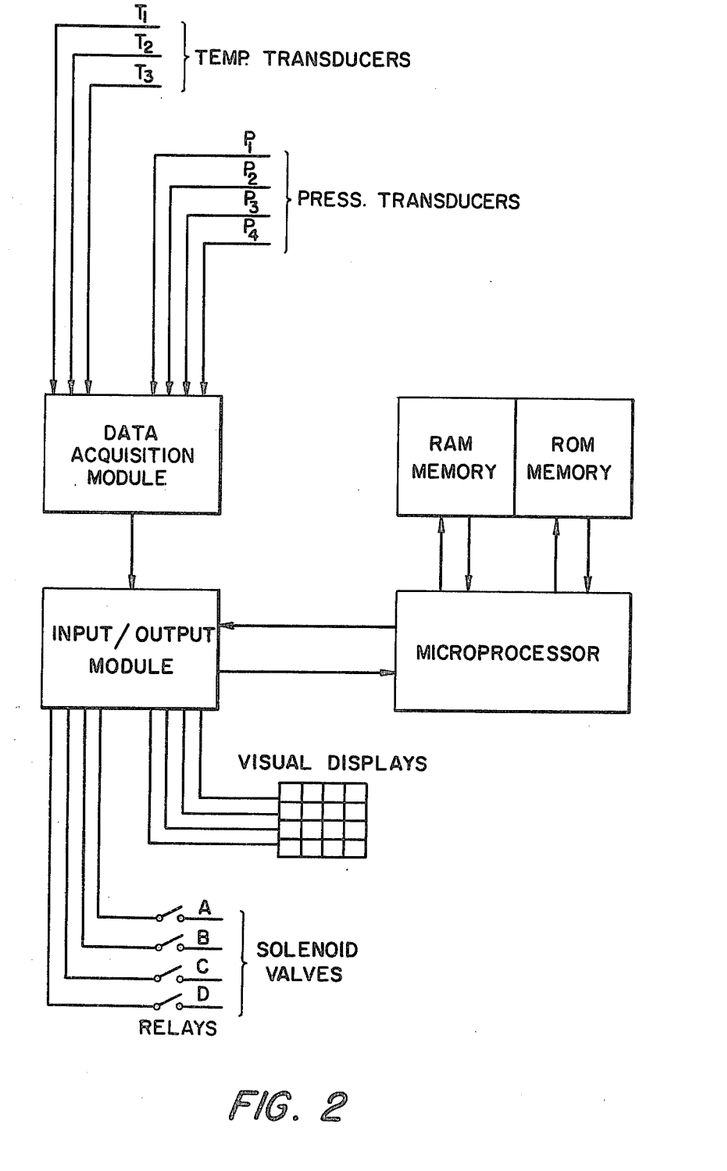
FIG. 2 is a detail view of the microprocessor sensor/control circuit of the heatless dryer in accordance with FIG. 1.

Typical circuitry for the above functions is shown in FIG. 2.

The apparatus of the invention is illustrated in the following drawings, in which.

The dryer of FIGS. 1 and 2 is composed of a pair of desiccant tanks I and II. These tanks are disposed vertically. Each tank contains a bed 1 of desiccant such as silica gel or activated alumina. Also provided in tanks I and II are desiccant fill and drain ports 8,9 for draining and filling of desiccant in the tanks.

Only two lines are required connecting the two tanks at top and bottom, respectively, for introduction of influent gas containing moisture to be removed, and for delivery of dry effluent gas, freed from moisture after having passed through the dryer, with the necessary valves for switching flow of influent and effluent gas to and from each tank. These lines are fitted with sensors to collect and feed information to the microprocessor by the circuitry shown in FIG. 2. This system includes an inlet line 2 fitted with inlet pressure gauges $P_1$, $P_2$ separated by an orifice 3. Thus, inlet differential pressure $P_1-P_2$ gauges inlet flow velocity. This with $P_1$ and $T_1$ indicates gas flow rate Qf. In place of the orifice, any other type of flow restriction can be used, such as a venturi, nozzle, meter or paddle wheel. Flow rate can also be determined as a function of pressure drop across the desiccant bed 1 or across the inlet valve 4.

The line 2 conducts the moist influent gas to the four-component inlet switching valve 4, including valves A,B,C,D. One of valves A,B directs the flow of influent gas to one of two inlet lines 5 and 6, one of lines 5, 6 always leading the influent gas to the top of each tank I, II, and the other of lines 5,6 according to valves C,D leading the purge flow of regenerating effluent gas to the exhaust via line 11 and muffler 12, venting to atmosphere.

At the bottom of each tank is a desiccant support 7 made of perforated metal cylinder, retaining the desiccant bed 1 in the tanks I and II. Outlet lines 13 and 14 from the bottom of tanks I and II, respectively, lead to the pair of ball check valves 15, 16. Valve 4 is operated by the microprocessor, but valves 15, 16 are pressure operated, the ball in the effluent line from the on-stream tank I and II is displaced on switching and start up of on-stream flow in line 13,14, while the other one of the balls 15',16' at such switching time moves against the seat, closing off the lines 13, 14 leading to the chamber undergoing regeneration at reduced pressure, and thus directing main effluent flow via the outlet line 17.

Disposed in each outlet lines 13 and 14 is a filter screen 18, which is movable, and is also made of sintered stainless wire mesh. This acts to retain any desiccant particles that might otherwise be carried out from the bed 1 past the desiccant support 7, to keep the outlet valve 15 and the remainder of the system clean of such particles.

From valves 15, 16 extends the dry gas effluent delivery line 17, to deliver the dried effluent gas from the dryer to the system being supplied therewith. In the line 17 there can be placed an outlet pressure gauge $P_5$ and a humidity sensor H, but these are optional, and can be omitted.

At valve 4A, B is a temperature sensor $T_1$, and at valve 4C,D is a second temperature sensor $T_3$, and at the valves 15, 16 temperature sensor.

A cross line 19 having a narrow passage bridges the outlet lines 13, 14, bypassing valves 15,16 when either is closed, and providing purge flow to the line 13, 14 leading to the off-stream tank. Line 19 due to its small diameter has a pressure-reducing function, inasmuch as downstream thereof pressure is reduced to atmospheric when one of purge valves C,D is open, and it also meters the volume of purge flow bled off the effluent gas at valves 15, 16 for regeneration of the spent tank. Purge exhaust valves C,D control purge flow via lines 11, 12 according to signal from the microprocessor, which opens and closes then as needed, and pressure gauge $P_4$ reads off the pressure in the valve C,D, and thus gives the regeneration pressure in each tank as it is undergoing regeneration.

If the left-hand tank I is on the drying cycle, and the right-hand tank II on the regenerating cycle, then valves 4A and D are open, 4B and C closed, and the operation of the dryer proceeds as follows: wet gas influent at, for example, 100 psig, and a flow rate of 305 s.c.f.m., saturated at 80° F., enters through the inlet line 2, passes the valve 4A (valve B being closed) and enters the top of the first tank I, and passes thence downwardly through the bed of desiccant 1 therein, for example, silica gel or activated alumina, to the bottom of the tank, and thence through filters 7, 6 and line 13, valve 15 to the dry gas outlet line 17. Effluent gas is delivered there at 100 psig and 265 s.c.f.m., dewpoint 100° F. The ball 16' prevents entry of dry gas into line 14 except via line 19. This metered remainder of the dry gas effluent, 40 s.c.f.m., is bled off through the line 19, where its pressure is reduced to atmospheric, and then passes through line 14 to the bottom of the second tank II, which is on the regeneration cycle. Purge flow passes upwardly through the desiccant bed 1, and emerges at the top into line 6, and thence passes through valve 4D, to line 11 and muffler 12, where it is vented to the atmosphere.

Since the time that each bed will be on the drying cycle is normally much greater than the length of time required to regenerate the spent bed, purge exhaust valves C,D are so actuated by the microprocessor that they are opened only for the time necessary to complete regeneration of the desiccant. When this time has elapsed, they are shut off, and the regenerated tank II is then automatically and slowly repressurized via line 19.

This cycle continues until the fixed cycle time has elapsed, whereupon the microprocessor then switches valve 4A, B so that wet gas influent entering through the inlet 2 passs through line 6 to the top of tank II, while check valve 16 shifts to open line 14 whereupon check valve 15 shifts to close line 13, so that dry gas effluent can now pass from the bottom of the tank II to the dry gas delivery line 17, while line 13 is closed, except to the flow of purge gas bypassing valve 15 via the cross-line 19, now reversed. Purge flow proceeds via line 13 to the bottom of tank I, which is on the regeneration cycle, and thence upwardly through the bed to the line 5 and thence through valve 4C, line 11, and muffler 12, where it is vented to the atmosphere. This cycle continues until the regeneration time cycle is completed, whereupon the microprocessor closes purge exhaust valve C. Accordingly, line 19 slowly repressurizes tank I. The system continues with tank II on the drying cycle until the fixed cycle time has elapsed, whereupon the microprocessor reverse valves 4A, B, and the cycle begins again.

Usually, the drying cycle is carried out with gas at a superatmospheric pressure, of the order of 15 to 350 psig. The orifice 19a in the cross-line 49 the purge ensures that the regeneration cycle is carried out at a pressure considerably reduced from that at which the adsorption cycle is effected.

The electric circuit connections for the microprocessor are shown in FIG. 2. The microprocessor includes a data acquisition module, for collecting data from the temperature and pressure transducers, an input/output module for input and output data receipt and control, the microprocessor, and RAM and ROM memory banks for storing the information used in the control function. The inlet pressure sensors $P_1$, $P_2$, which together also can be used to ascertain flow rate, and the purge and regeneration pressure sensors $P_3$, $P_4$ are connected to pressure transducers, which are connected to the data acquisition module, which is directly connected with the input and output module. The input/output module is also connected with the microprocessor, and this is connected to the memory banks.

The inlet temperature sensors $T_1$ and $T_3$, the outlet temperature sensor $T_2$ and the purge temperature sensors $T_2$ and $T_1$ are connected to the temperature transducers, which in turn are connected to the data acquisition module.

In addition to these sensors, which are essential, there can also be included an atmospheric pressure sensor, and an outlet pressure sensor $P_5$, all connected to the transducers and data acquisition module.

The alarm system, which is optional, can detect humidity via the humidity sensor H, a failure in the four-channel switch 1, and failure in any of the sensors, whereupon the microprocessor can sound an alarm. The alarm system is connected to the input/output module.

There is also provision for visual display of the readings sensed by the sensors, and the values calculated by the microprocessor thereupon, which include, for example, inlet flow rate, inlet pressure, inlet temperature, and the energy saved. These are connected to the input/output module.

Finally, the system control controlling the four-channel switching valve 1, i.e., the inlet valve A or B and the purge valve D or C, in the form of solenoid valves and relays is connected to the input/output module.

The microprocessor control system shown in FIG. 2 operates as follows:

A. Operating data is transferred to the data acquisition module from the remote pressure and temperature transducers. The signals are converted to digital quantities and passed into the input/output module.

B. The microprocessor orders data from the input/output module and performs calculations on the data based upon the programs contained in the ROM memory. Temporary numbers used in the computations are stored in the RAM memory, or "scratch" pad.

C. At the appropriate times, the microprocessor sends signals through the input/output module to control the system solenoid valve relays.

D. Operating data and "fault" signals are transmitted to the visual displays.

In FIG. 2, the inlet differential pressure, $P_1-P_2$, indicates the inlet velocity. This plus $P_1$ and $T_1$ yields the inlet flow rate in SCFM.

$P_3$ and $T_2$, knowing the purge orifice size and gas, are used to calculate the actual purge flow rate in SCFM.

The regeneration pressure and temperature, $P_4$ and $T_3$, are used to determine the amount of water which can be removed by the purge.

$T_2$ less $T_1$ indicates the amounts of humidity in the inlet air.

Figure 3:
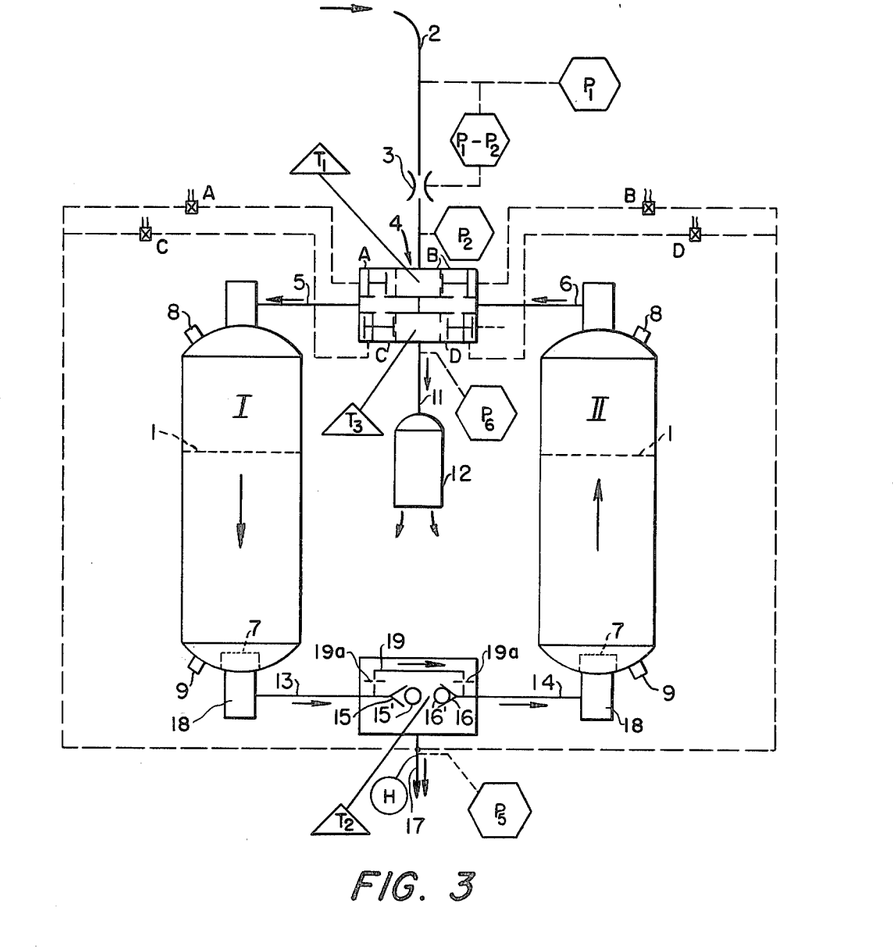
FIG. 3 is a schematic view of another type of two-bed heatless desiccant dryer in accordance with the invention.
Figure 4:
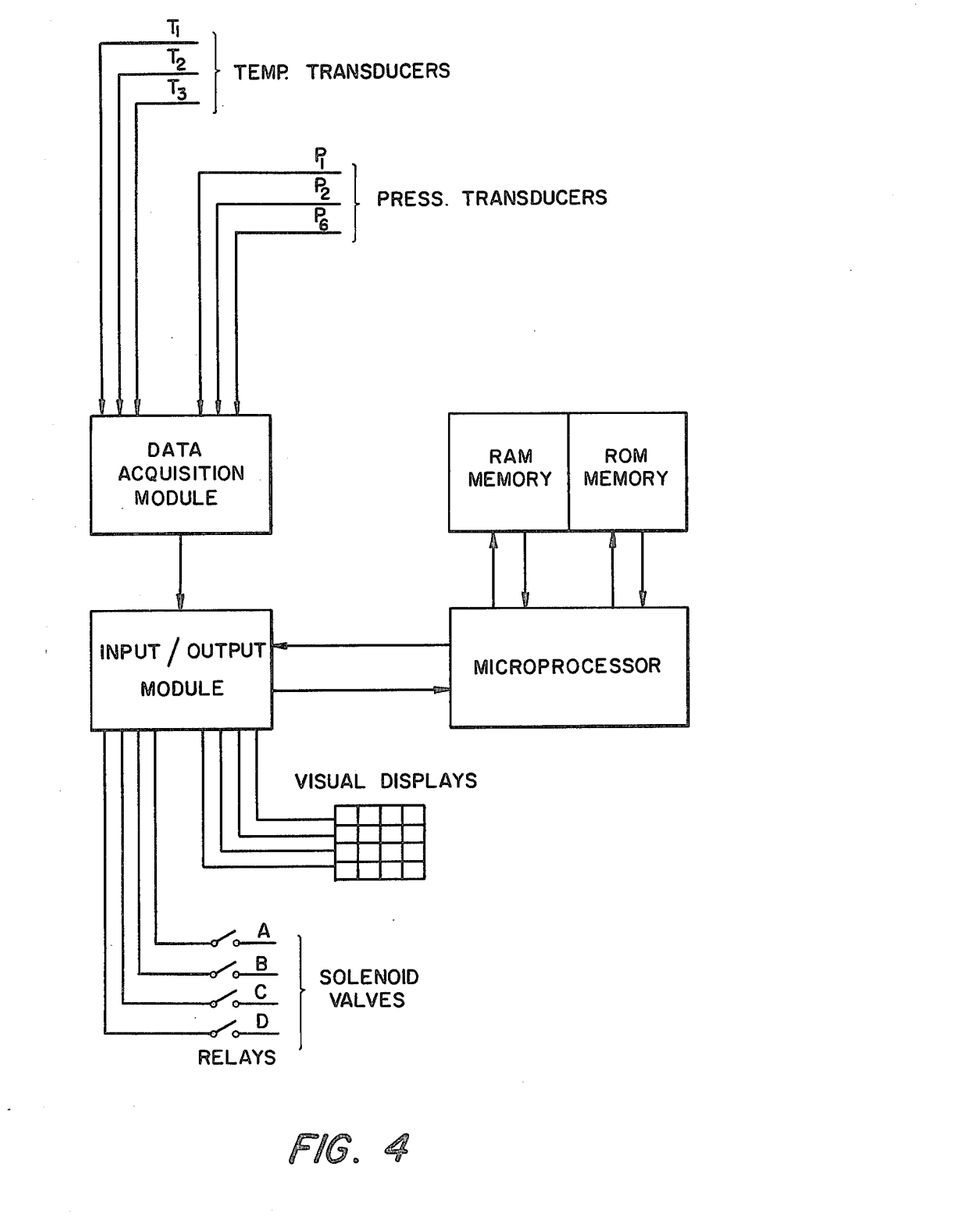
FIG. 4 is a detail view of the microprocessor sensor/control circuit of the heatless desiccant dryer of FIG. 3.

It is also possible in a variation of FIG. 2 to calculate pressure upstream of the purge orifice knowing the inlet pressure $P_1$, and flow rate and the pressure loss across the system. One less pressure transducer is required with this scheme. FIGS. 3 and 4 illustrate this variation.

The dryer of FIG. 3 is very similar to that shown in FIG. 1, and consequently like reference numerals are used for like parts.

In the system shown in FIG. 3, the only difference is that the pressure transducers $P_3$, $P_4$ are omitted, and replaced by a single pressure transducer $P_6$ in exhaust line 11, following valve components 4C, D. The temperature transducers remain the same, and also the pressure transducers $P_1$, $P_2$. The pressure transducer $P_6$ determines regeneration pressure at the outlet from the tank undergoing regeneration, in lieu of the inlet, as in the system of FIG. 1.

Thus, this system includes an inlet line 2 fitted with inlet pressure gauges $P_1$, $P_2$ separated by an orifice 3. The inlet differential pressure $P_1$ minus $P_2$ gauges inlet flow velocity and this taken with $P_1$ and $T_1$ indicates gas flow rate Qf.

The line 2 conducts the moist influent gas to the four-component inlet switching valve 4, including valves A,B,C,D. One of valves A,B directs the flow of influent gas to one of two inlet lines 5 and 6, one of lines 5, 6 always leading the influent gas to the top of each tank I, II, and the other of lines 5,6 according to valves C,D leading the purge flow of regenerating effluent gas to the exhaust via line 11 and muffler 12, venting to atmosphere.

At the bottom of each tank is a desiccant support 7 made of a perforated metal cylinder, retaining the desiccant bed 1 in the tanks I and II. Outlet lines 13 and 14 lead from the bottom of tanks I and II, respectively, to the pair of ball check valves 15, 16. Valve 4 is operated by the microprocessor, but valves 15, 16 are pressure-operated. The ball in the effluent line from the on-stream tank I or II is displaced on switching and start up of on-stream flow in lines 13, 14, while the other one of the balls 15', 16' at such switching time moves against the seat, opening the line from the on-stream chamber and closing off the line 13, 14 leading to the chamber undergoing regeneration at reduced pressure, and thus directing main effluent flow via the outlet line 17.

Disposed in each outlet line 13 and 14 is a filter screen 18, which is movable, and is also made of sintered stainless wire mesh. This acts to retain any desiccant particles that might otherwise be carried out from the bed 1 past the desiccant support 7, to keep the outlet valve 15 and the remainder of the system clean of such particles.

From valves 15, 16 extend the dry gas effluent delivery line 17, to deliver the dried effluent gas from the dryer to the system being supplied therewith. In the line 17 there can be placed an outlet pressure gauge $P_5$ and a humidity sensor H, but these are optional, and can be omitted.

At valve 4A, B is a temperature sensor $T_1$, and at valve 4C,D a second temperature sensor $T_3$, and at the valves 15, 16 temperature sensor $T_2$.

A cross line 19 bridges the outlet lines 13, 14 and is fitted with two ball valves 15, 16 at the end of lines 13, 14. The line 19 has a pressure-reducing function inasmuch as beyond it pressure is reduced to atmospheric, and it also meters the volume of purge flow bled off the effluent gas at valve 15 for regeneration of the spent tank. Pressure gauge $P_6$ reads off the pressure in the purge exhaust line 11 at purge exhaust valves C,D, which control purge flow via lines 11,12 according to signal from the microprocessor, which opens and closes them as needed.

If the left-hand tank I is on the drying cycle, and the right-hand tank II on the regenerating cycle, then valves 4A and D are open, 4B and C closed, and the operation of the dryer proceeds as follows: wet gas influent at, for example, 100 psig, and a flow rate of 305 s.c.f.m., saturated at 80° F., enters through the inlet line 2, passes the valve 4A (valve B being closed), and enters the top of the first tank I, and thence downwardly through the bed of desiccant 1 therein, for example, activated alumina, to the outlet, and thence through filters 7, 6 and line 13, valve 15 to the dry gas outlet line 17. Effluent gas is delivered there at 100 psig and 265 s.c.f.m., dewpoint $-100°$ F. The ball 16' prevents entry of dry gas into line 14 except via line 19. This metered remainder of the dry gas effluent, 40 s.c.f.m., is bled off through the line 19, where its pressure is reduced to atmospheric, and then through line 14 to the bottom of the second tank II, which is on the regeneration cycle. Purge flow passes upwardly through the desiccant bed 1, and emerges at the top into line 6, and thence passes through valve 4D to line 11, and muffler 12, where it is vented to the atmosphere.

Since the time that each bed will be on the drying cycle is normally much greater than the length of time required to regenerate the spent bed, purge exhaust valves C,D are so actuated by the microprocessor that they are opened only for the time necessary to complete regeneration of the desiccant. When this time has elapsed, they are shut off, and the regenerated tank is then automatically repressurized via line 19.

This cycle continues until the fixed cycle time has elapsed, whereupon the microprocessor then switches valve 4A, B so that wet gas influent entering through the inlet 2 passes through line 6 to the top of tank II, while check valve 16 shifts to open line 14 whereupon check valve 15 shifts to close line 13, so that dry gas effluent can now pass from the bottom of the tank II to the dry gas delivery line 17, while line 13 is closed, except to the flow of purge gas bypassing valve 15 via the cross-line 19, now reversed. Purge flow proceeds via line 13 to the bottom of tank I, which is on the regeneration cycle, and thence upwardly through the bed to the line 5 and thence through valve 4C, line 11, and muffler 12, where it is vented to the atmosphere. This cycle continues until the regeneration time cycle is completed, whereupon the microprocessor closes purge exhaust valve C. Accordingly, line 19 slowly repressurizes tank I. The system continues with tank II on the drying cycle until the fixed cycle time has elapsed, whereupon the microprocessor reverse valves 4A, B, and the cycle begins again.

Usually, the drying cycle is carried out with gas at a superatmospheric pressure, of the order of 15 to 350 psig.

The electric circuit connections for the microprocessors are shown in FIG. 4. The microprocessor includes a data acquisition module, for collecting the temperature and pressure transducers, an input/output module for input and output receipt and control, the microprocessor, and RAM and ROM memory banks for storing the information used in the control function. The inlet pressure sensors $P_1$, $P_2$, which together also can be used to ascertain flow rate, and the purge and regeneration pressure sensor $P_6$ is connected to the pressure transducers, which is connected to the data acquisition module, which is directly connected with the input and output module. The input/output module is also connected with the microprocessor, and this is connected to the memory banks.

The inlet temperature sensors $T_1$ and $T_3$, the outlet temperature sensor $T_2$ and the purge temperature sensors $T_3$ and $T_1$ are connected to the temperature transducers, which in turn are connected to the data acquisition module.

In addition to these sensors, which are essential, there can also be included an atmospheric pressure sensor, and an outlet pressure sensor $P_5$, all connected to the transducers and data acquisition module.

The alarm system, which is optional, can detect humidity via the humidity sensor H, a failure in the four-channel switch 1, and failure in any of the sensors, whereupon the microprocessor can sound an alarm. The alarm system is connected to the input/output module.

There is also provision for visual display of the readings sensed by the sensors, and the valves calculated by the microprocessor thereupon, which include, for example, inlet flow rate, inlet pressure, inlet temperature, and the energy saved. These are connected to the input/output module.

Finally, the system control controlling the four-channel switching valve 1, i.e., the inlet valve A or B and the purge valve D or C, in the form of solenoid valves and relays is connected to the input/output module.

The microprocessor accurately senses the dryer operating conditions, precisely calculates the required purge flow necessary to thoroughly regenerate a desiccant bed based on the sensed operating conditions, and controls both the dryer cycling time, on a fixed time basis, and the regeneration time based on the calculated purge flow required. As a result, minimal purge gas is consumed and the dryer is more economical to operate than any other type of dehydration system for almost all applications.

In addition to its control functions, the microprocessor displays the paramount operating data on visual indicators. It also monitors the dryer for correct operation. In the event of a fault condition, the microprocessor diagnoses the fault and displays a flashing coded message on an alarm indicator. Thus, the microprocessor assists in maintaining the dryer system and facilitates troubleshooting.

The following functions are performed by the computer control system:

A. Sensing Dryer Operating Conditions

—Inlet pressure
—Inlet flow rate
—Inlet temperature
—Moisture adsorbed
—Regeneration pressure B. Calculating Purge —Purge required for complete regeneration
—Purge flow rate

C. Controlling Dryer Operation

—Switching chambers on a fixed time basis
—Discontinuing purge after passage of required flow
—Reconditioning desiccant beds by a manually actuated start-up program
—Providing maximum purge upon high outlet humidity (H-option only)
—Providing a compressor shutdown interlock to assist in securing a plant air system

D. Displaying Instantaneous Operating Data

—Inlet flow rate (SCFM)
—Inlet pressure (PSIG)
—Inlet temperature (° F.)
—Accumulated energy saved (KW-HR)

E. Indicating Fault Conditions

—High outlet humidity (H-option only)
—Switching failure
—Sensor failure
—Switching or check valve failure
—Electronic circuit failure
—Low inlet pressure
—Excessive flow rate
—Excessive inlet temperature
—Dirty muffler As indicated previously, the various inlet and outlet purge and regeneration sensors have multiple functions, according to which bed is on the adsorption cycle, and which bed is on the regeneration cycle, since a given sensor on one cycle will sense inlet temperature, for example, while on the other cycle it will sense outlet temperature. Which sensor senses which function in which cycle is apparent from this portion of the disclosure.

The dryer systems of the invention can be used with any type of sorbent adapted to adsorb moisture from gases. Activated carbon, alumina, silica gel, magnesia, various metal oxides, clays, Fuller's earth, bone char, and Mobilbeads, and like moisture-adsorbing compounds, can be used as the desiccant.

Molecular sieves also can be used, since in many cases these have moisture-removing properties. This class of materials includes zeolites, both naturally-occurring and synthetic, the pores in which may vary in diameter from the order of several Ångstrom units to from 12 to 15 Å or more. Chabasite and analcite are representative natural zeolites that can be used. Synthetic zeolites that can be used include those described in U.S. Pat. Nos. 2,442,191 and 2,306,610. All of these materials are well known as desiccants, and detailed descriptions thereof will be found in the literature.

The dryers described and shown in the drawings are all adapted for purge flow regeneration with the purge passing in counterflow to the wet gas influent. This, as is well known, is the most efficient way of utilizing a desiccant bed. As a wet gas passes through a desiccant bed in one direction, the moisture content of the desiccant progressively decreases, and normally the least amount of moisture will have been adsorbed at the outlet end of the bed. It is consequently only sound engineering practice to introduce the regenerating purge gas from the outlet end, so as to avoid driving moisture from the wetter part of the bed into the drier part of the bed, and thus lengthen the regeneration cycle time required. If the purge flow be introduced at the outlet end, then the moisture present there, although it may be in a small amount, will be removed by the purge flow and brought towards the wetter end of the bed. Thus, the bed is progressively regenerated from the outlet end, and all the moisture is carried for the least possible distance through the bed before it emerges at the inlet end.

Nonetheless, for some purposes, it may be desirable to run the purge flow in the same direction as the influent flow. In accordance with the invention, it is possible to carry the moisture content of the desiccant to a very high level, much higher than is normally feasible, because of the protecting action of the microprocessor, which makes it possible to ensure regeneration at a time more precisely gauged to moisture level than has heretofore been possible. Consequently, in many cases if the bed is brought nearly to the saturation point throughout, it will make little difference if the purge flow enters at the influent end or at the outlet end, and the invention contemplates both types of operation, although of course counterflow regeneration is preferred in most cases.

The following Example in the opinion of the inventors represents a preferred embodiment of dryer and method of operation of a dryer system in accordance with the invention:

EXAMPLE

A two-bed heatless dryer of the type shown in FIGS. 1 and 2, having two desiccant beds 50 inches long and 8.25 inches in diameter, each bed containing 75 lbs of activated alumina, was used to dry air at 70% relative humidity, 67° F. to 70° F. and 80 p.s.i.g. inlet pressure. The superficial flow velocity of the air was 55 feet per minute.

Data was collected for a number of drying cycles carried out using this apparatus. It was apparent from the data that the microprocessor controlled regeneration cycle time adequately to fully regenerate the sorbent bed, and that this control with the fixed cycling time of ten minutes, five minutes on each bed, made it possible to terminate the drying cycle time at a safe moisture level in the effluent gas. It was also clear from the different times of the cycle that the microprocessor adjusted cycle regeneration length to match variation in moisture level of the influent air, and thus preserve desiccant life by cutting down the number of regenerations materially.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can be removed from the sorbent with a reduction in pressure, during regeneration, without application of heat. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, Fuller's earth, bone char and natural and synthetic zeolites. The zeolites are particularly effective for the removal of nitrogen, hydrogen and olefins, such as ethylene or propylene, from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple and forms no part of the instant invention.

In some cases, the sorbent can be used to separate a plurality of materials in a single pass. Activated alumina, for example, will adsorb both moisture vapor and carbon dioxide, in contrast to Mobilbeads which will adsorb only water vapor in such a mixture.

It will, however, be understood that the process is of particular application in the drying of gases, and that this is the preferred embodiment of the invention.

Having regard to the foregoing disclosure, the following is claimed as the inventive and patentable embodiments thereof:

1. A process for reducing the concentration of one or more first gases in a mixture thereof with a second gas to below a limiting maximum concentration thereof in the second gas by passing the mixture in contact with and from one end to another end of one of two beds of sorbent having a preferential affinity for the first gas; adsorbing first gas thereon to form a gaseous effluent having a concentration thereof below the maximum and forming a concentration gradient of first gas in the bed progressively decreasing from one end to the other end as the adsorption continues and an increasing concentration of first gas in the bed defining a concentration front progressively advancing in the bed from one end to the other end as sorbent capacity therefor decreases, while passing a purge flow of gaseous effluent through the other of the two beds of sorbent to desorb first gas adsorbed thereon, and reverse the advance of the concentration front of first gas in the bed, and thereby regenerating the bed for another cycle of adsorption; periodically interchanging the beds so that, alternately, one bed is on the regeneration and the other on the adsorption portions of the cycle; which comprises sensing the operating conditions including gas flow rate through the bed on adsorption; inlet and outlet temperatures and inlet and outlet pressures in the bed on adsorption; and regeneration pressure in the bed on regeneration; calculating the quantity of purge flow required to regenerate the sorbent in the bed on regeneration; calculating the purge flow rate under the operating conditions; and then controlling the regeneration time and arresting purge flow when the bed on regeneration has been regenerated; controlling cycling time at which the beds are interchanged to a period not shorter than the regeneration time; and interchanging the sorbent beds at the end of such cycling time.

2. A process in accordance with claim 1, in which the regeneration cycle is shorter in duration than the adsorption cycle, and the bed being regenerated is closed off and purge flow discontinued when regeneration is complete, and the remainder of the cycling time being used for cooling down the regenerated bed, so that it is at a temperature for adsorption when the flow of influent gas to that bed is resumed.

3. A process according to claim 1, in which the cycling time is fixed at a repetitive time interval longer than the longest time required for regeneration of the spent bed.

4. A process according to claim 1, in which regeneration of the spent bed is carried out utilizing only the heat of adsorption in the bed for desorption.

5. A process according to claim 1, in which a microprocessor is used programmed to sense the operating conditions including flow rate, inlet and outlet temperature and pressure and regenerating pressure; from the operating conditions so sensed calculate the quantity of purge required to regenerate the sorbent bed off-stream for regeneration, and calculate the purge flow rate, and, based on these calculations, control the regeneration time so that purge flow ceases when the sorbent bed has been regenerated; control the cycling time; and switch the sorbent beds at the end of such cycling time.

6. A process according to claim 1, applied to the drying of the gas mixture.

7. A process for reducing the concentration of one or more first gases in a mixture thereof with a second gas to below a limiting maximum concentration thereof in the second gas by passing the mixture in contact with and from one end to another end of a bed of sorbent having a preferential affinity for the first gas and periodically requiring regeneration; adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases; and then periodically passing a purge flow of gaseous effluent through the bed of sorbent to desorb first gas adsorbed thereon, and reverse the advance of the concentration front of first gas in the bed, and thereby regenerating the bed for another cycle of adsorption; which comprises sensing the operating conditions during adsorption including gas flow rate through the bed, inlet and outlet temperatures and inlet and outlet pressures, calculating the quantity of purge flow required to regenerate the sorbent at a selected regeneration pressure, and then providing the calculated purge flow at a selected purge flow rate while controlling the regeneration time and arresting purge flow when the bed has been regenerated; and then resuming passing the mixture through the bed for another adsorption cycle.

8. A process according to claim 7, in which regeneration of the spent bed is carried out utilizing only the heat of adsorption in the bed for desorption.

9. A process according to claim 7, in which a microprocessor is used, programmed to sense the operating conditions during adsorption including flow rate, inlet and outlet temperature and pressure and regenerating pressure; from the operating conditions so sensed calculate the quantity of purge required to regenerate the sorbent bed off-stream for regeneration, and calculate the purge flow rate, and, based on these calculations, control the regeneration time so as to arrest purge flow when the sorbent bed has been regenerated, and restore the sorbent bed at that time to resume the adsorption cycle.

10. A process according to claim 7, applied to the drying of the gas mixture.

11. A gas fractionating apparatus for reducing the concentration of one or more first gases in a mixture thereof with a second gas to below a limiting maximum concentration thereof in the second gas by passing the mixture in contact with and from one end to another end of one of two beds of sorbent having a preferential affinity for the first gas; adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases, while passing a purge flow of gaseous effluent through the other of the two beds of sorbent to desorb first gas adsorbed thereon, and reverse the advance of the concentration front of first gas in the bed, and thereby regenerating the bed for another cycle of adsorption; periodically interchanging the beds so that, alternately, one bed is on the regeneration and the other on the adsorption portions of the cycle; comprising as the essential components at least two vessels for reception of sorbent beds that are adapted for alternate periodic adsorption and regeneration; flow lines intercommunicating the vessels with each other and with a source of influent gas mixture and a delivery for effluent gas; valves in the gas flow lines controlling gas flow therethrough so that one vessel is on the adsorption portion of the cycle while the other vessel is on the regeneration portion of the cycle; means for sensing each of (1) the gas flow rate through the vessel on adsorption,
(2) inlet and outlet gas temperatures,
(3) inlet and outlet gas pressures, and
(4) regeneration pressure;

and sending signals corresponding thereto to a microprocessor assembly; and a microprocessor assembly having an input receiving signals from the sensing means and an output controlling opening and closing of the valves; and programmed to acquire and utilize the information from the sensing means to calculate the quantity of purge required to regenerate the sorbent bed off-stream for regeneration; calculate the purge flow rate; and, based on these calculations, control the regeneration time by opening and closing the valves so as to arrest purge flow when the sorbent bed has been regenerated; control the cycling time; and switch the sorbent beds at the end of such cycling time.

12. A gas fractionating apparatus according to claim 11, in which the vessels each comprise a sorbent bed capable of adsorbing and desorbing water vapor, so that the apparatus is applicable to the drying of gases.

13. A gas fractionating apparatus according to claim 11, in which the microprocessor assembly comprises a data acquisition module, an input/output module, a microprocessor, and a memory bank.

14. A gas fractionating apparatus according to claim 13 comprising pressure and temperature sensors and transducers connected to the data acquisition module.

15. A gas fractionating apparatus according to claim 14 comprising solenoid valves and relays and visual displays connected to the input/output module.

16. A gas fractionating apparatus according to claim 11 in which the vessels each have chambers therein for a bed of sorbent, and lines for delivery of influent gas to and for delivery of effluent gas from the chambers.

17. A gas fractionating apparatus according to claim 11, comprising means for diverting and reducing the pressure of a portion of effluent gas from the one vessel to the other vessel for purge flow regeneration.

18. A gas fractionating apparatus according to claim 11, wherein the vessels are heaterless.

19. A gas fractionating apparatus for reducing the concentration of one or more first gases in a mixture thereof with a second gas to below a limiting maximum concentration thereof in the second gas by passing the mixture in contact with and from one end to another end of a bed of sorbent having a preferential affinity for the first gas; adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases, then periodically passing a purge flow of gaseous effluent through the bed of sorbent to desorb first gas adsorbed thereon, and reverse the advance of the concentration front of first gas in the bed, and thereby regenerating the bed for another cycle of adsorption; comprising as the essential components a vessel for reception of a sorbent bed that is adapted for alternate periodic adsorption and regeneration; gas flow lines communicating the vessel with a source of influent gas mixture and a delivery for effluent gas; valves in the gas flow lines controlling gas flow therethrough; means for sensing during adsorption each of (1) the gas flow rate through the vessel on adsorption,
(2) inlet and outlet gas temperatures,
(3) inlet and outlet gas pressures, and
(4) regeneration pressure;

and sending signals corresponding thereto to a microprocessor assembly; and a microprocessor assembly having an input receiving signals from the sensing means and an output controlling opening and closing of the valves; and programmed to acquire and utilize the information from the sensing means to calculate the quantity of purge required to regenerate the sorbent bed off-stream for regeneration; calculate the purge flow rate; and, based on these calculations, control the regeneration time by opening and closing the valves so as to arrest purge flow when the sorbent bed has been regenerated; control the cycling time; and switch the sorbent beds at the end of such cycling time.

20. A gas fractionating apparatus according to claim 19, in which the vessel comprises a sorbent bed capable of adsorbing and desorbing water vapor, so that the apparatus is applicable to the drying of gases.

21. A gas fractionating apparatus according to claim 19, in which the microprocessor assembly comprises a data acquisition module; an input/output module; a microprocessor; and a memory bank.

22. A gas fractionating apparatus according to claim 21, comprising pressure and temperature sensors and transducers connected to the data acquisition module.

23. A gas fractionating apparatus according to claim 21, comprising solenoid valves and relays and visual displays connnected to the input/output module.

24. A gas fractionating apparatus according to claim 19, in which the vessel has a chamber therein for a bed of sorbent, and lines for delivery of influent gas to and for delivery of effluent gas from the chamber.

25. A gas fractionating apparatus according to claim 19, wherein the vessel is heaterless.

* * * * *

UNITED STATES PATENT AND TRADEMARK OFFICE
CERTIFICATE OF CORRECTION

PATENT NO. : 4,197,095
DATED : April 8, 1980
INVENTOR(S) : Donald H. White, Jr. et al It is certified that error appears in the above–identified patent and that said Letters Patent are hereby corrected as shown below:

| | | |
|---|---|---|
| Column 2, line 33 | : | "Pat." should be --Pats.--. |
| Column 3, line 11 | : | "adsorbent" should be --sorbent--. |
| Column 3, line 41 | : | "absorber" should be --adsorber--. |
| Column 4, line 12 | : | "absorber" should be --adsorber--. |
| Column 7, line 46 | : | "generated" should be --regenerated--. |
| Column 7, line 61 | : | "used" should be --lost--. |
| Column 7, line 63 | : | "fractinators" should be --fractionators--. |
| Column 7, line 66 | : | "fractinators" should be --fractionators--. |
| Column 7, line 68 | : | "fractinators" should be --fractionators--. |
| Column 10, line 28 | : | after "chamber" insert --on--. |
| Column 12, line 2 | : | delete "is". |
| Column 12, line 3 | : | after "sensor" insert --$T_2$--. |
| Column 12, line 15 | : | "then" should be --them--. |
| Column 12, line 53 | : | "passs" should be --passes--. |
| Column 13, line 5 | : | delete "the purge". |
| Column 17, line 50 | : | "Pat." should be --Pats.--. |

Signed and Sealed this

Eighth Day of July 1980

[SEAL]

Attest:

SIDNEY A. DIAMOND

Attesting Officer — Commissioner of Patents and Trademarks